(12) United States Patent
Weill et al.

(10) Patent No.: US 8,976,655 B2
(45) Date of Patent: Mar. 10, 2015

(54) EVALUATING A CAPACITY OF A CELL OF A RADIO ACCESS NETWORK

(75) Inventors: Ofer Weill, Modi'in (IL); Michael Ben-Nun, Ramat Hasharon (IL); Oren Sadeh, Tel Aviv (IE)

(73) Assignee: Vasona Networks Inc., Santa Clara, CA (US)

( * ) Notice: Subject to any disclaimer, the term of this patent is extended or adjusted under 35 U.S.C. 154(b) by 0 days.

(21) Appl. No.: 13/532,834

(22) Filed: Jun. 26, 2012

(65) Prior Publication Data

US 2013/0021928 A1 Jan. 24, 2013

Related U.S. Application Data

(63) Continuation-in-part of application No. 13/233,043, filed on Sep. 15, 2011.

(60) Provisional application No. 61/383,414, filed on Sep. 16, 2010.

(51) Int. Cl.
| | | |
|---|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 24/08 | (2009.01) |
| H04W 16/04 | (2009.01) |

(52) U.S. Cl.
CPC ............... H04W 24/08 (2013.01); H04W 16/04 (2013.01)

USPC ........... 370/232; 370/233; 370/234; 370/252; 370/328

(58) Field of Classification Search
CPC ............ H04L 65/1083–65/1086; H04L 65/80; H04L 43/0864; H04L 43/10–43/50
USPC ......... 370/229–235, 236, 241, 242–246, 250, 370/252, 328, 477; 455/445–446
See application file for complete search history.

(56) References Cited

U.S. PATENT DOCUMENTS

| | | | |
|---|---|---|---|
| 6,385,673 | B1 | 5/2002 | DeMoney |
| 6,697,378 | B1 | 2/2004 | Patel |
| 8,205,004 | B1 | 6/2012 | Kaufman et al. |
| 2003/0067872 | A1 | 4/2003 | Harrell et al. |
| 2004/0203825 | A1 | 10/2004 | Daniel et al. |
| 2005/0114538 | A1 | 5/2005 | Rose |
| 2005/0148314 | A1 | 7/2005 | Taglienti et al. |
| 2005/0204046 | A1 | 9/2005 | Watanabe |
| 2006/0209701 | A1* | 9/2006 | Zhang et al. ............ 370/249 |
| 2008/0212480 | A1* | 9/2008 | Shimonishi ............ 370/236 |
| 2009/0327079 | A1 | 12/2009 | Parker et al. |
| 2010/0034089 | A1 | 2/2010 | Kovvali et al. |
| 2010/0074275 | A1 | 3/2010 | Sahai |
| 2010/0131671 | A1 | 5/2010 | Kohli et al. |

(Continued)

*Primary Examiner* — Awet Haile
*Assistant Examiner* — Eric Myers
(74) *Attorney, Agent, or Firm* — Oren Reches (57) ABSTRACT

A method, a computer readable media and a device, the method is for evaluating a capacity of a cell of a radio access network (RAN), and may include monitoring, by a monitor, (a) downstream traffic that is directed towards the cell and (b) responses from the cell to the downstream traffic, to provide monitoring results; calculating, in response to the monitoring results, round trip time (RTT) statistics; and generating an estimate of the capacity of the cell in response to the RTT statistics.

17 Claims, 10 Drawing Sheets

(56) References Cited

U.S. PATENT DOCUMENTS

| | | |
|---|---|---|
| 2010/0151899 A1 | 6/2010 | Lekutai |
| 2010/0195602 A1 | 8/2010 | Kovvali et al. |
| 2011/0032898 A1 | 2/2011 | Kazmi |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2012/0039191 A1 | 2/2012 | Foster et al. |
| 2012/0052866 A1* | 3/2012 | Froehlich et al. ............. 455/445 |
| 2012/0087260 A1 | 4/2012 | Devarapalli et al. |
| 2013/0016620 A1* | 1/2013 | Den Hartog et al. ......... 370/252 |
| 2013/0163428 A1* | 6/2013 | Lee et al. ...................... 370/235 |

\* cited by examiner

Monitoring, by a monitor, (a) downstream traffic that is directed towards the cell and (b) responses from the cell to the downstream traffic, to provide monitoring results. 20

Generating an estimate of the capacity of the cell in response to comparison results. Each comparison result can be obtained by comparing, the sequence number of packets aimed to one or more mobile station to the sequence number that appears in acknowledgement messages from that one or more mobile stations. 62

Allocating bandwidth, by a bandwidth allocator, to the downstream traffic in response to the estimate of the capacity of the cell. The bandwidth may be allocated such as not to exceed the estimated capacity of the cell. 50

EVALUATING A CAPACITY OF A CELL OF A RADIO ACCESS NETWORK

RELATED APPLICATIONS

This application is a continuation in part of U.S. patent application Ser. No. 13/233,043 filed Sep. 15, 2011, which in turn is claims priority from provisional patent filing date Sep. 16, 2010, Ser. No. 61/383,414, both being incorporated herein by reference.

BACKGROUND OF THE INVENTION

The Architecture of modern wireless networks allows radio access network (RAN) to interface with the Internet or other external networks via so called core networks.

A RAN can include multiple cells, wherein each cell includes a base station that communicates with multiple user devices. The base cell transmits downstream traffic to the user devices and the latter transmit upstream traffic to the base station. The bandwidth of the downstream traffic well exceeds the bandwidth of the upstream traffic.

The capacity of the cell can represent the amount of information that is exchanged between the base station and the user devices. Due to the asymmetry between upstream and downstream traffic the capacity can be regarded as the amount of downstream transmitted information.

The amount of downstream information can vary over time. It may be responsive to the status of the wireless medium (high interference level, high ambient noise), to the relative distance between the base station and each of the user devices and to the bandwidth transmission policy applied by the base station. For example—transmitting the same amount of information to a user device that is closer to the base station may require less resources (for example—by applying a more aggressive modulation scheme) than transmitting the same amount of information to a user device that is more distant from the base station or is otherwise located in a noisier location. Yet for another example—a maximum throughput policy may involve transmitting more information to closer user devices while an equal distribution scheme can transmit the same amount of downstream information to different users.

If the amount of traffic that is sent to the cell exceeds the cell's capacity then congestions may occur, traffic gets lost and there is a reduction in the performance of the cell.

There is a growing need to provide an efficient cell capacity estimation scheme.

SUMMARY OF THE INVENTION

According to an embodiment of the invention there is provided a method for evaluating a capacity of a cell of a radio access network (RAN), the method may include monitoring, by a monitor, (a) downstream traffic that is directed towards the cell and (b) responses from the cell to the downstream traffic, to provide monitoring results; calculating, in response to the monitoring results, round trip time (RTT) statistics; and generating an estimate of the capacity of the cell in response to the RTT statistics.

The calculating of the RTT statistics may include calculating connection establishment RTT statistics and calculating established connection RTT statistics; and wherein the generating of the estimate of the capacity of the cell is responsive to at least one out of the connection establishment RTT statistics and the established connection RTT statistics.

The method may include generating the estimate of the capacity of the cell in response to an outcome of a statistical function applied on the connection establishment RTT statistics and the established connection RTT statistics.

The method may include defining a minimal RTT value in response to the monitoring results.

The calculating of the RTT statistics may be responsive to priorities associated with different sessions of the downstream traffic.

The method may include monitoring a bandwidth of the downstream traffic.

The method may include allocating bandwidth, by a bandwidth allocator, to the downstream traffic in response to the estimate of the capacity of the cell.

The RTT statistics may include a current RTT value.

The method may include reducing a bandwidth allocated to the downstream traffic if the current RTT value exceeds an upper threshold.

The method may include determining the upper threshold in response to the monitoring results.

The method may include reducing the estimate of the capacity of the cell if the current RTT value exceeds an upper threshold.

The method may include increasing the estimate of the capacity of the cell if a bandwidth of the downstream traffic is proximate to the estimate of the capacity of the cell and the current RTT value is below a lower threshold.

The method may include increasing the estimate of the capacity of the cell to a maximal value if a bandwidth of the downstream traffic substantially differs from the estimate of the capacity of the cell and the current RTT value is below a lower threshold.

The method may include monitoring re-transmission attempts of portions of the downstream traffic to provide re-transmission statistics; and wherein the generating of the estimate of the capacity of the cell is response to the RTT statistics and to the re-transmission statistics.

The method may include monitoring Transmission Control Protocol (TCP) timeout events to provide TCP timeout statistics; and wherein the generating of the estimate of the capacity of the cell is response to the TCP timeout statistics and to the RTT statistics.

The monitor may be connected to an element of a core network, the core network is connected between the RAN and another network.

The method may include calculating, in response to the monitoring results, RTT statistics that represents changes of the RTT over time.

There may be provided a computer readable media that may include a non-transitory computer readable medium that stores instructions for executing any method or any combination of stages mentioned in the specification. For example, the non-transitory computer readable medium may store instructions for monitoring downstream traffic that is directed towards the cell and responses from the cell to the downstream traffic, to provide monitoring results; calculating, in response to the monitoring results, round trip time (RTT) statistics; and generating an estimate of the capacity of the cell in response to the RTT statistics.

According to an embodiment of the invention there may be provided a method for evaluating a capacity of a cell of a radio access network (RAN), the method may include monitoring, by a monitor, (a) downstream traffic that is directed towards the cell and (b) responses from the cell to the downstream traffic, to provide monitoring results; calculating, in response to the monitoring results, differences between sequence numbers of packets sent to mobile stations of the RAN and sequence numbers appearing in acknowledgement messages sent from the mobile stations, to provide comparison results; and generating an estimate of the capacity of the cell in response to the comparison results.

According to an embodiment of the invention there may be provided a computer readable media that comprises a non-transitory computer readable medium that stores instructions for monitoring, by a monitor, (a) downstream traffic that is directed towards the cell and (b) responses from the cell to the downstream traffic, to provide monitoring results; calculating, in response to the monitoring results, differences between sequence numbers of packets sent to mobile stations of the a radio access network (RAN) and sequence numbers appearing in acknowledgement messages sent from the mobile stations, to provide comparison results; and generating an estimate of the capacity of the cell in response to the comparison results.

According to an embodiment of the invention a system may be provided and may be arranged to execute any method or any stages mentioned in the specification. The system may include a monitor arranged to monitor downstream traffic that is directed towards the cell and responses from the cell to the downstream traffic, to provide monitoring results; a statistics calculator arranged to calculate, in response to the monitoring results, round time trip (RTT) statistics; and a cell capacity estimator arranged to generate an estimate of the capacity of the cell in response to the RTT statistics.

The system may include a monitor arranged to monitor (a) downstream traffic that is directed towards the cell and (b) responses from the cell to the downstream traffic, to provide monitoring results; calculate, in response to the monitoring results, differences between sequence numbers of packets sent to mobile stations of the a radio access network (RAN) and sequence numbers appearing in acknowledgement messages sent from the mobile stations, to provide comparison results; and generate an estimate of the capacity of the cell in response to the comparison results.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The term "statistics" can have its regular meaning and can be interpreted as a plural form of a statistic which is a quantity (such as but not limited to mean, median, weighted sum, standard deviation and the like) calculated from data.

The term "round time trip" (RTT) can have its regular meaning and can be interpreted as a period of time that starts when a signal (such as a packet) is sent to a target entity (such as a user device) and ends with a reception of a response to the signal. RTT can include only the transmission periods but may also include the time it takes the target device to respond to the signal.

The term "core network" can have its regular meaning and can be interpreted as being a network that is coupled between a radio access network (RAN) and another network such as but not limited to the Internet or another packet switched network. The core network can control various parameters of the downstream traffic that flows towards the RAN.

The following description refers to a cell but it can be applied mutatis mutandis to a sector of a RAN.

Figure 1:
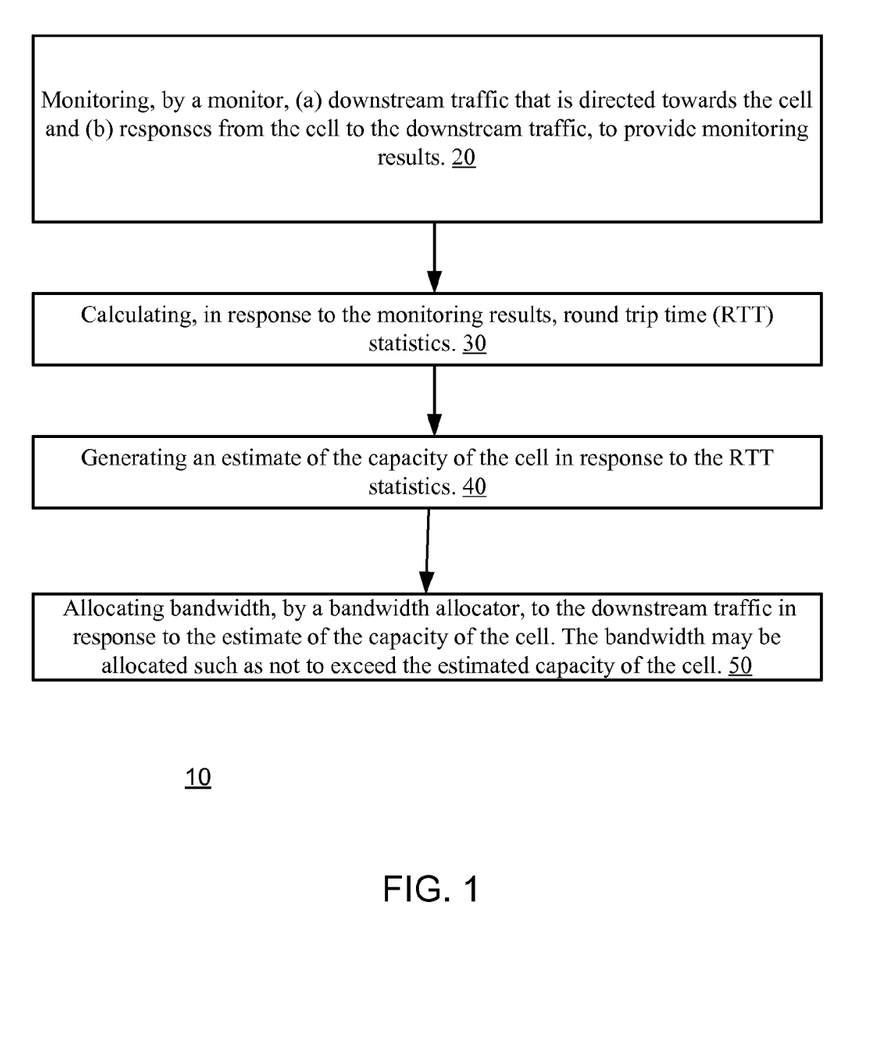
FIG. 1 illustrates a method according to an embodiment of the invention.

FIG. 1 illustrates method 10 for evaluating a capacity of a cell of a radio access network (RAN) according to an embodiment of the invention.

Method 10 can be applied to one or more cells of the RAN and can even be applied to all of the cells of the RAN.

Method 10 can start by stage 20 of monitoring, by a monitor, (a) downstream traffic that is directed towards the cell and (b) responses from the cell to the downstream traffic, to provide monitoring results.

The monitor can belong to a core network or be coupled to an entity (such as a server) of the core network. According to another embodiment of the invention the monitor can be coupled to an entity of the RAN such as a RNC or a base station.

The monitoring results can including timing information relating to downstream packets and to upstream packets (including timing of upstream packets that include a response to the downstream packets—such as acknowledgement or ping messages).

The monitoring can be performed in a cyclic manner, in a random manner, in a pseudo-random manner, in response to events and the like.

The monitoring can be executed in a consecutive or non-consecutive manner, over one or more monitoring periods.

Stage 20 may be followed by stage 30 of calculating, in response to the monitoring results, round trip time (RTT) statistics.

The RTT statistics can include minimum RTT values (at the presence of traffic), maximum RTT values, average RTT values, median RTT values, weighted sum RTT values, a sum of squares of RTT values, and the like.

The RTT statistics can be calculated while taking into account the whether the relevant signals are included in a connection establishment process (connection establishment traffic), to an already established connection (established connection RTT statistics) or to a combination thereof.

The established connection RTT statistics may be more accurate in the sense that it is less affected by the processing period of the application layer in the user device but on the other hand it is expected to have more samples of the established connection RTT statistics.

Any combination of these two types of RTT statistics can be provided. Stage 30 may include, for example, applying a statistical function on the connection establishment RTT statistics and the established connection RTT statistics.

According to an embodiment of the invention the RTT statistics can refer to different periods of time—there may be a current RTT value that may reflect current RTT statistics and there may be RTT statistics that refer to older periods of time. The RTT statistics can take into account current RTT measurements and older RTT measurements.

Stage 30 may include defining a minimal RTT value in response to the monitoring results. The minimal RTT value can be measured at a presence of cell traffic and can reflect a fastest transmission and response cycle. The minimal RTT value can be used to set thresholds such as a lower threshold or an upper threshold that once reached can trigger a bandwidth re-allocation step.

Stage 30 can include calculating the RTT statistics in response to priorities associated with different sessions of the downstream traffic. The different sessions can be aimed to different user devices and their priorities can be driven from the priorities of these user devices but this is not necessarily so. Different RTT statistic values can be associated with different priorities. Additionally or alternatively, RTT statistics values can reflect RTT associated with different priorities. A priority responsive scheme can assign more weight to RTT associated with higher priorities.

Stage 30 can include calculating the RTT statistics in response to quality of service levels associated with different sessions of the downstream traffic. The different sessions can be aimed to different user devices and their quality of service levels can be driven from the quality of service levels of these user devices but this is not necessarily so. Different RTT statistic values can be associated with different quality of service levels. Additionally or alternatively, RTT statistics values can reflect RTT associated with different quality of service levels. A priority responsive scheme can assign more weight to RTT associated with higher quality of service levels.

It is noted that the RTT statistics can be responsive to quality of service levels and, additionally or alternatively, to priorities.

It is noted that stage 30 can include calculating RTT statistics that represents changes of RTT over time. This may include trend analysis, Stage 30 may be followed by stage 40 of generating an estimate of the capacity of the cell in response to the RTT statistics.

Stage 40 may include, for example, increasing the estimate of the capacity of the cell with an increment of the RTT current value. Yet according to other embodiments of the invention the estimate can be responsive to changes in the RTT statistics, to bandwidth of the downstream traffic, to a combination of the RTT statistics and to the bandwidth, and the like.

Stage 40 may be followed by stage 50 of allocating bandwidth, by a bandwidth allocator, to the downstream traffic in response to the estimate of the capacity of the cell. The bandwidth may be allocated such as not to exceed the estimated capacity of the cell.

Figure 2:
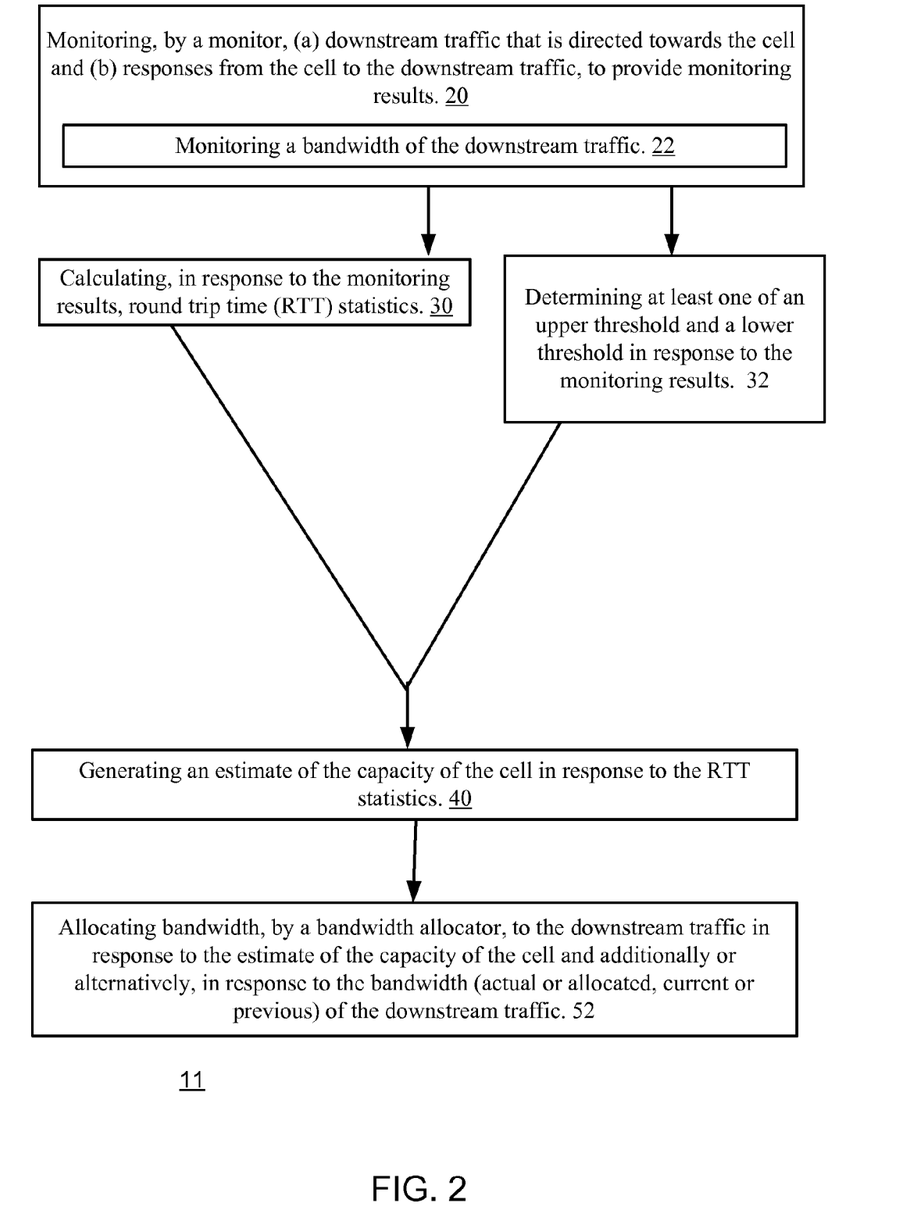
FIG. 2 illustrates a method according to an embodiment of the invention.

FIG. 2 illustrates method 11 according to an embodiment of the invention.

Method 11 can start by stage 20.

Stage 20 may include monitoring, by a monitor, (a) downstream traffic that is directed towards the cell and (b) responses from the cell to the downstream traffic, to provide monitoring results.

Stage 20 may include stage 22 of monitoring a bandwidth of the downstream traffic.

Stage 20 may be followed by stage 30 of calculating, in response to the monitoring results, round trip time (RTT) statistics. Stage 30 may include calculating a current RTT value, a minimal RTT value and/or a maximal RTT value.

Stage 20 may also be followed by stage 32 of determining at least one of an upper threshold and a lower threshold in response to the monitoring results. The lower threshold is lower than the upper threshold. Each of these thresholds can calculated in response to at least one of the current RTT value, the minimal RTT value and the maximal RTT value. For example, the lower threshold can be slightly above (few percents or few tenths percents) the minimal RTT value. Yet for another example, the upper threshold can be slightly below (few percents or few tenths percents) the maximal RTT value. Yet for a further example—each of the thresholds may be calculated to be at a certain distance between the minimal RTT value and the maximal RTT value.

Stages 30 and 32 may be followed by stage 40 of generating an estimate of the capacity of the cell in response to the RTT statistics.

Stage 40 may be followed by stage 52 of allocating bandwidth, by a bandwidth allocator, to the downstream traffic in response to the estimate of the capacity of the cell and additionally or alternatively, in response to the bandwidth (actual or allocated, current or previous) of the downstream traffic.

Stage 52 may include at least one of the following stages:
1. Reducing a bandwidth allocated to the downstream traffic if the current RTT value exceeds the upper threshold.
2. Reducing the estimate of the capacity of the cell if the current RTT value exceeds an upper threshold.
3. Increasing the estimate of the capacity of the cell if a bandwidth of the downstream traffic is proximate to the estimate of the capacity of the cell and the current RTT value is below a lower threshold.
4. Increasing the estimate of the capacity of the cell to a maximal value if a bandwidth of the downstream traffic substantially differs from the estimate of the capacity of the cell and the current RTT value is below a lower threshold.

Figure 3:
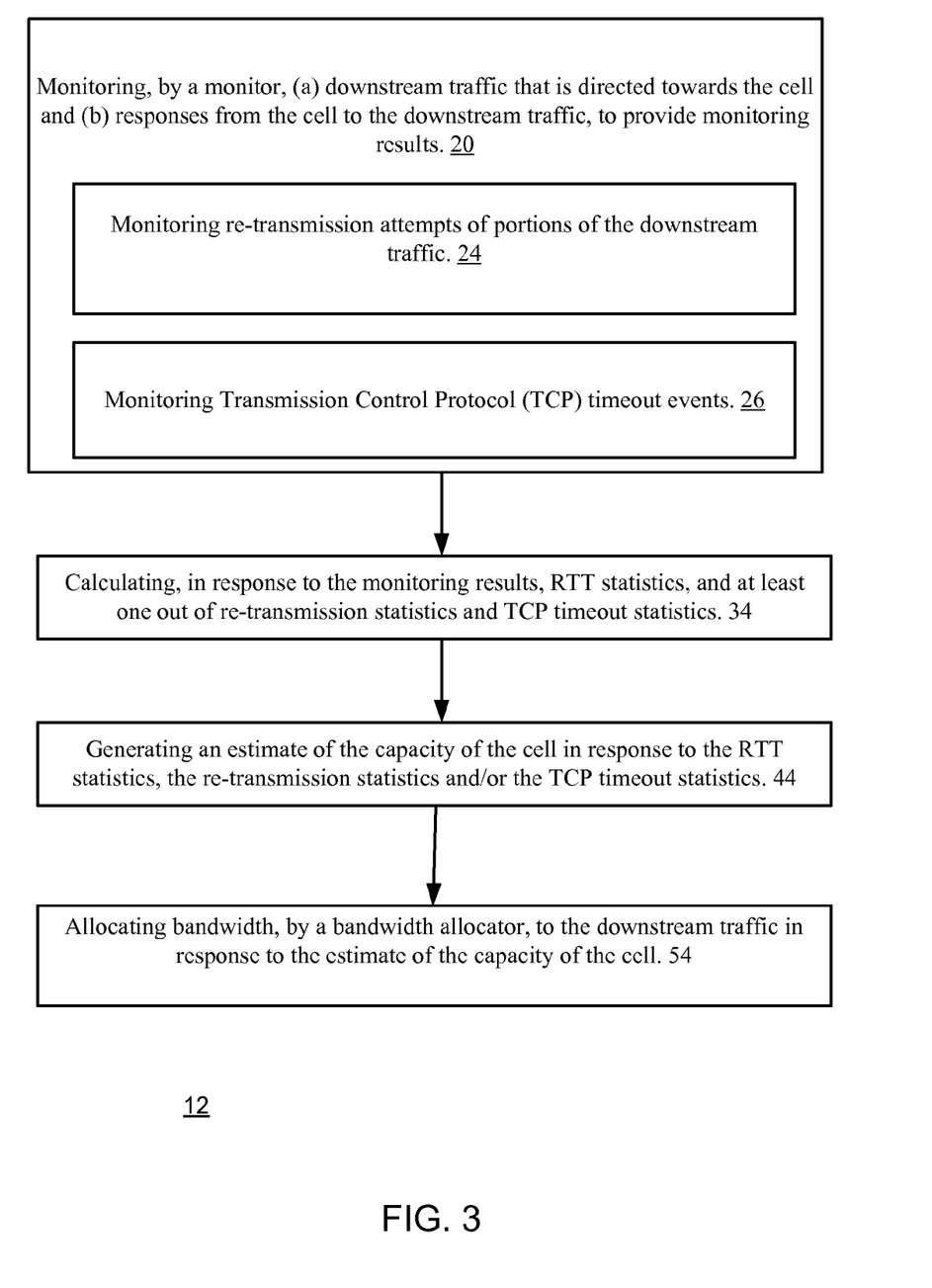
FIG. 3 illustrates a method according to an embodiment of the invention.

FIG. 3 illustrates method 12 for evaluating a capacity of a cell of a radio access network (RAN) according to an embodiment of the invention.

Method 12 can start by stage 20.

Stage 20 may include monitoring, by a monitor, (a) downstream traffic that is directed towards the cell and (b) responses from the cell to the downstream traffic, to provide monitoring results.

Stage 20 may include at least one of stages 24 and 26.

Stage 24 may include monitoring re-transmission attempts of portions of the downstream traffic.

Stage 26 may include monitoring Transmission Control Protocol (TCP) timeout events.

Stage 24 and 26 may also provide monitoring results.

Stage 20 may be followed by stage 34 of calculating, in response to the monitoring results, RTT statistics, and at least one out of re-transmission statistics and TCP timeout statistics.

Stage 34 may be followed by stage 44 of generating an estimate of the capacity of the cell in response to the RTT statistics, the re-transmission statistics and/or the TCP timeout statistics.

Stage 44 may be followed by stage 54 of allocating bandwidth, by a bandwidth allocator, to the downstream traffic in response to the estimate of the capacity of the cell.

Any combination of any stages of any one of methods 10, 11 and 12 can be provided.

Figure 4:
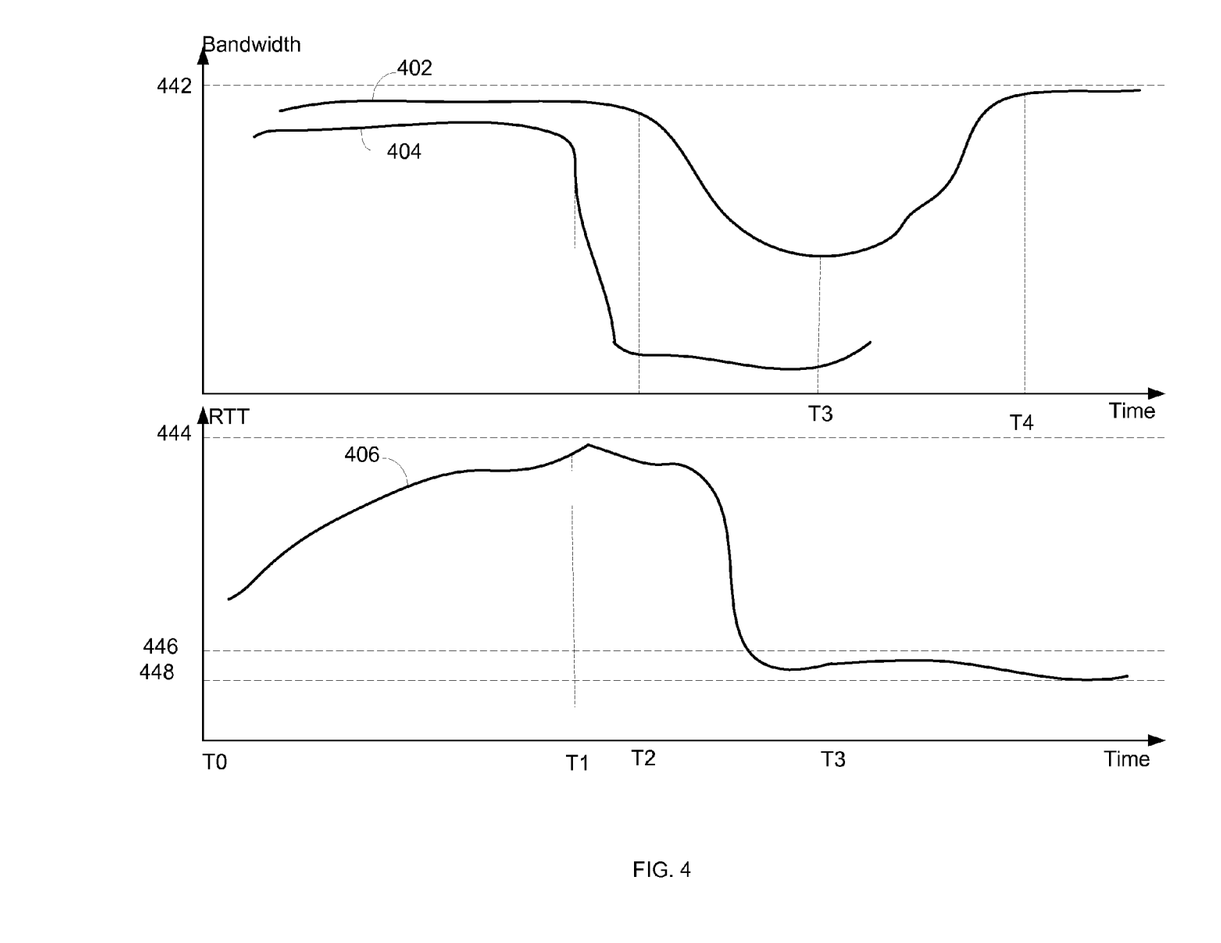
FIG. 4 illustrates an example of an estimation of a capacity of the cell, RTT current value and bandwidth value according to an embodiment of the invention.

FIG. 4 illustrates an example of an estimation of a capacity of the cell, RTT values and bandwidths according to an embodiment of the invention.

FIG. 4 includes a first graph 410 that includes a first curve 402 that represents the estimate of the capacity of the cell and a second curve 404 that represents the bandwidth of the cell or of downstream traffic aimed to the cell. The x-axis of this first graph 410 represents time and the y-axis represents bandwidth.

FIG. 4 also includes a second graph 420 that includes a third curve 406 that represents RTT values over a period of time. The x-axis of this second graph 420 represents time and the y-axis represents RTT values.

The first curve 402 is higher then the second curve 404 as the allocated bandwidth to the cell is below the estimate of the capacity of the cell.

During a first period (between point of times T0 and T1) the bandwidth is high—it is very close to the estimate of the capacity of the cell 402. The estimate of the capacity of the cell is proximate to a maximal value of the capacity of the cell (Cmax 431).

Third curve 406 shows that the RTT values increase over the first period—indicating that the load on the cell increases over the first period.

During a second period (that ranges between points in time T1 and T2) the bandwidth dramatically decreases while the RTT remains relatively close to the upper threshold 444. During this second period the estimate of the capacity of the cell may start a lowering process.

During a third period (that ranges between points in time T1 and T2) the RTT value decreases to values that are below a lower threshold 446 and may reach the minimal RTT value 446. During this third period the bandwidth continues to be very low.

The estimate of the capacity of the cell continues to drop and may reach a minimal value at T3.

During a fourth period (that ranges between points in time T3 and T4) the RTT value remains below the lower threshold 446 and the bandwidth remains very low. During this period the estimate of the capacity of the cell increases till reaching the maximal value—in order to allow an allocation of bandwidth that exceeds the current bandwidth of the traffic directed to the cell—in order to allow a seamless provision of traffic to the cell—even if the bandwidth of the downstream traffic dramatically increases.

FIGS. 5A-5D illustrate various systems and their environments according to various embodiments of the invention.

Figure 5A:
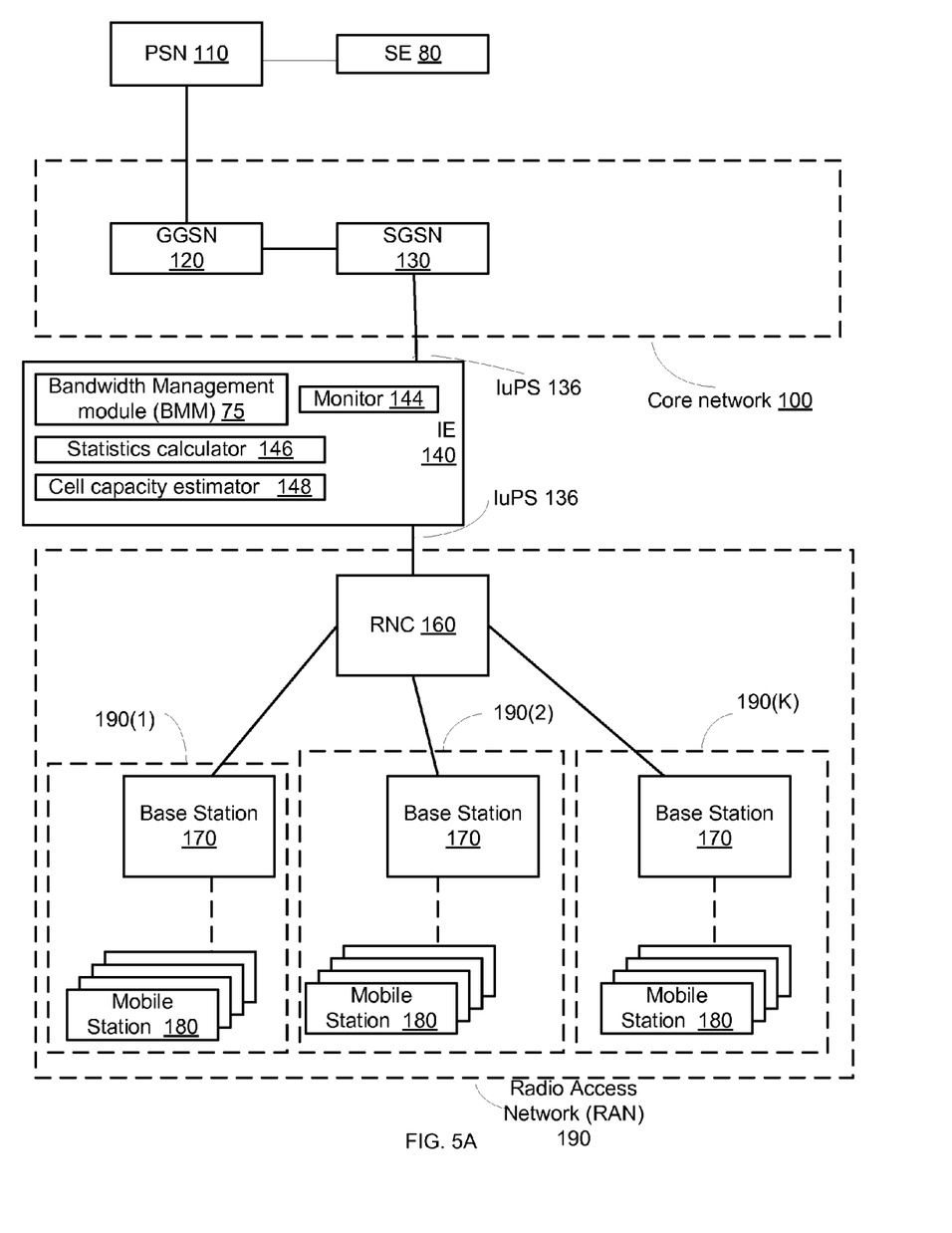
FIGS. 5A-5E illustrate systems and their environments according to an embodiment of the invention.

The system of FIG. 4A includes an intermediate entity (IE) 140 that includes a bandwidth management module (BMM) 75, a monitor 144, a statistics calculator 146 and a cell capacity estimator 148.

The monitor 144 is arranged to monitor downstream traffic that is directed towards the cell and responses from the cell to the downstream traffic, to provide monitoring results.

The statistics calculator 146 is arranged to calculate, in response to the monitoring results, round time trip (RTT) statistics and additionally or alternatively any other statistics relating to the traffic to or from a cell.

The cell capacity estimator 148 is arranged to generate an estimate of the capacity of the cell in response to the RTT statistics.

The system 140 is arranged to execute any of thy mentioned above methods or any combination of any stages of any of these mentioned above methods.

FIG. 5A illustrates the IE 140 as being connected between core network 100 and RAN 190.

Core network 100 includes a Gateway GPRS (General Packet Radio Service) Support Node (GGSN) 120 and Service GPRS Support Node (SGSN) 130. The GGSN 120 is connected to a packet switched network (PSN) 110 that in turn is connected to SE 80. The SGSN 130 is connected between the GGSN 120 and the IE 140. IE 140 is illustrated as being connected to the IsPS interfaces 136 between core network 100 and RAN 190.

RAN 190 has multiple cells such as cells 190(1), 190(2) till 190(K), K being a positive integer. Each cell has a base station 170 and multiple user devices such as mobile stations 180. Downstream traffic passes from the core network 100 towards the RAN 190. The base stations 170 are controlled by the Radio Access Controller (RNC) 160.

Figure 5B:
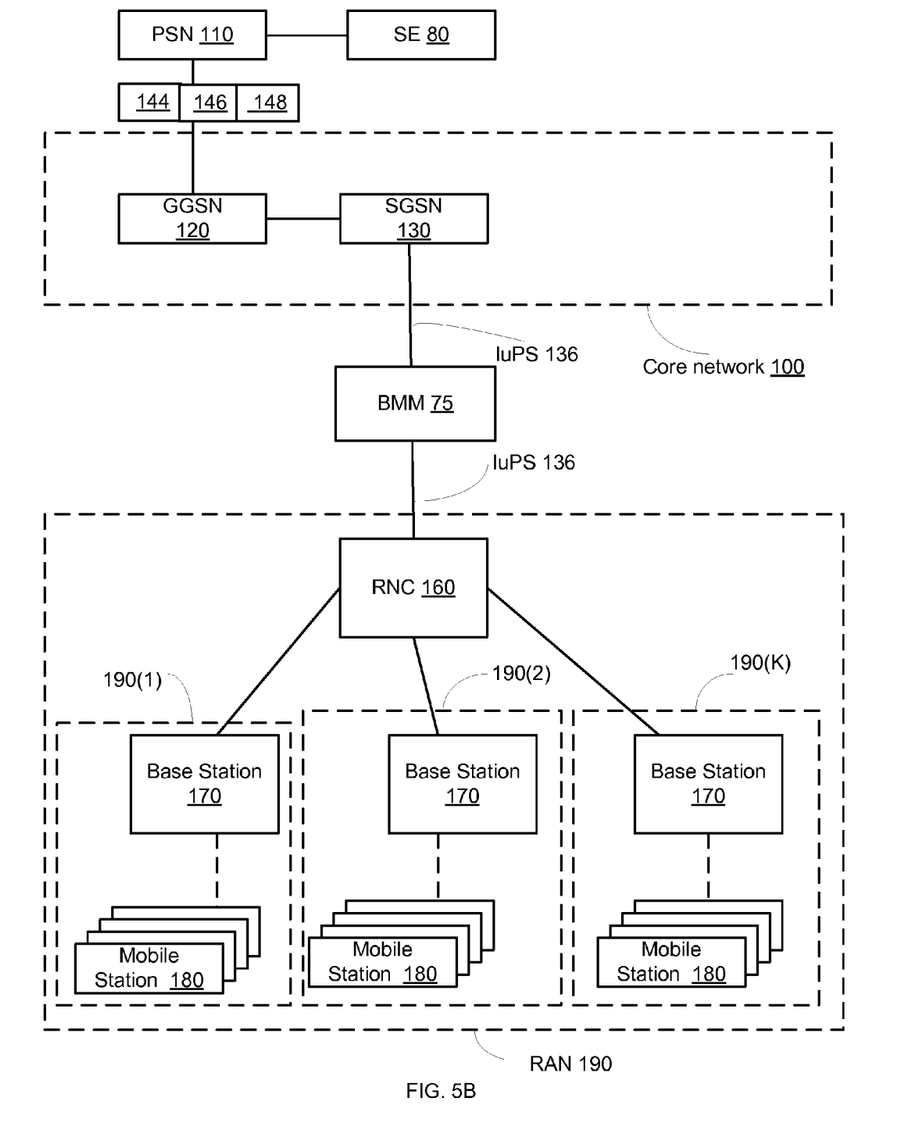

FIG. 5B differs from FIG. 5A by illustrating bandwidth management module (BMM) 75 as being connected between core network 100 and RAN 190. It also illustrates the monitor 144, the statistics calculator 146 and the cell capacity estimator 148 as being coupled between the core network 100 and PSN 110.

Figure 5C:
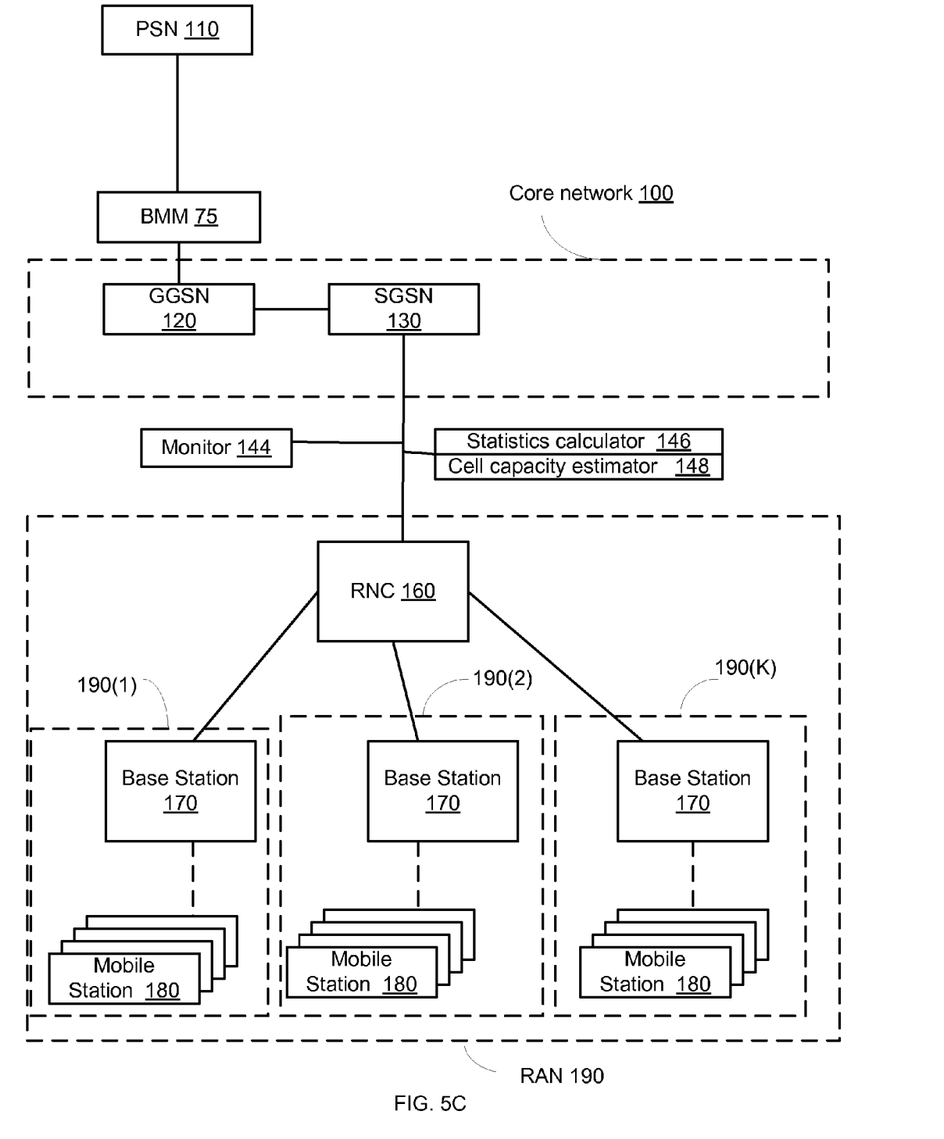

FIG. 5C differs from FIG. 5A by illustrating bandwidth management module (BMM) 75 connected between the core network 100 and PSN 110 and by illustrating monitor 144, statistics calculator 146 and cell capacity estimator 148 as being coupled between core network 100 and RAN 190.

Figure 5D:
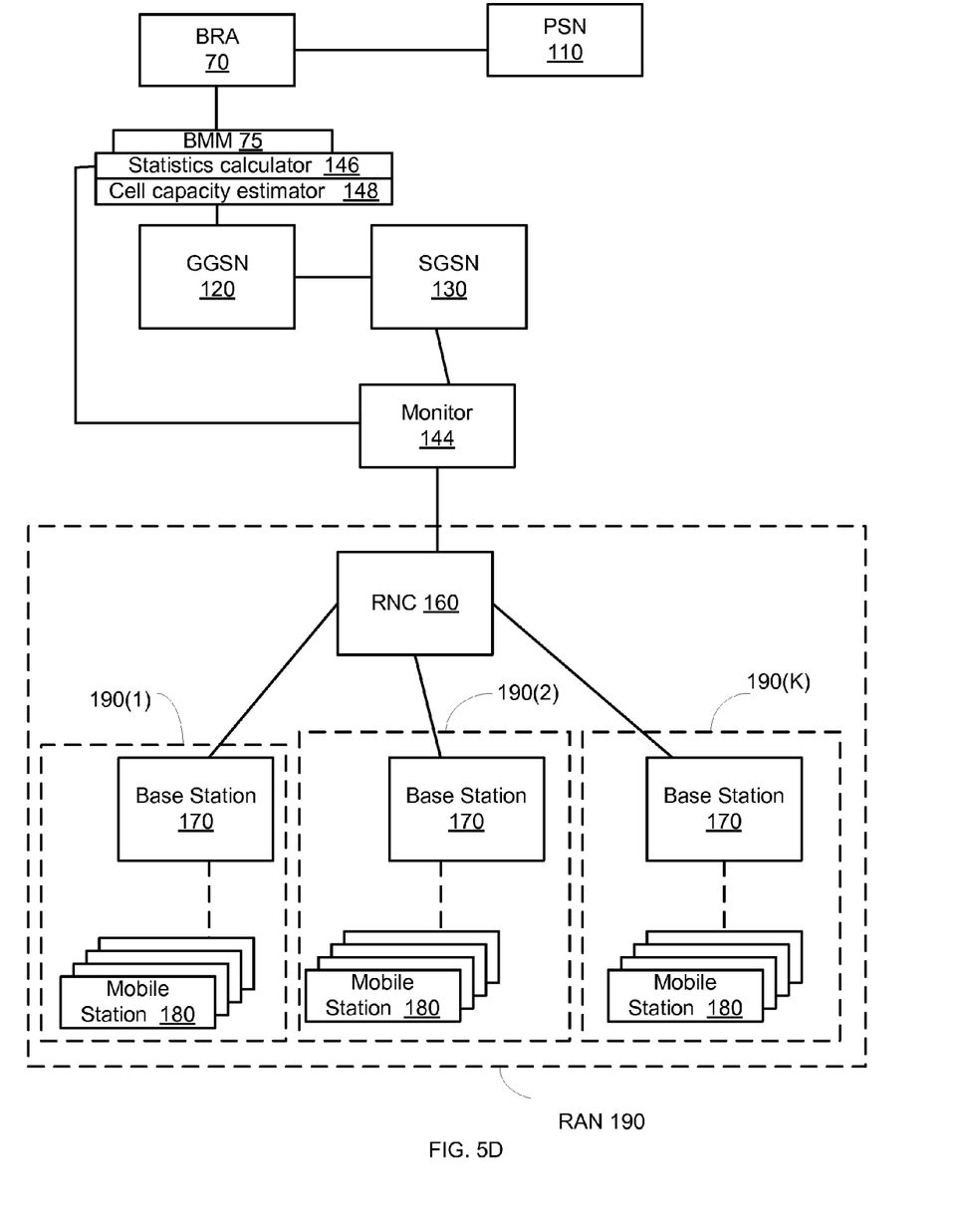

FIG. 5D differs from FIG. 5A by illustrating bandwidth management module (BMM) 75 statistics calculator 146 and cell capacity estimator 148 as being connected between core network 100 and RAN and by having monitor 144 being coupled between the core network 100 and PSN 110.

Figure 5E:
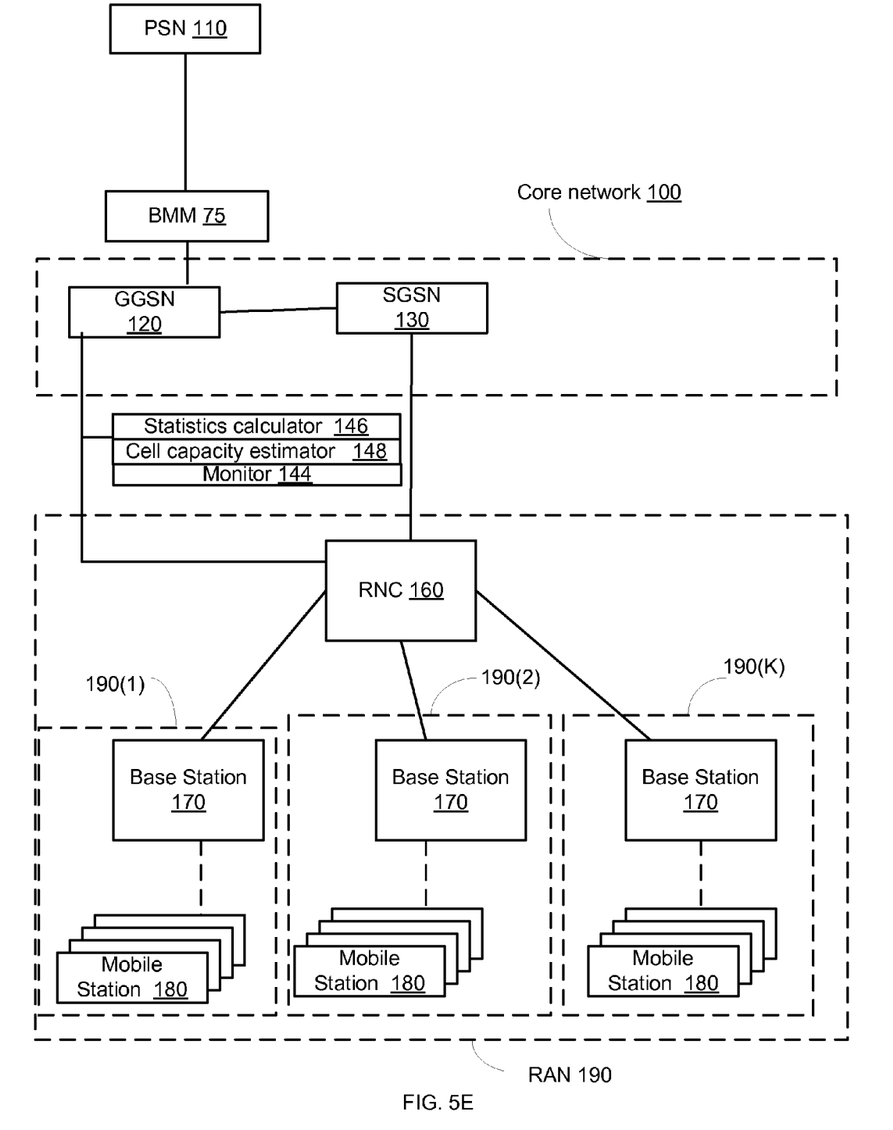

FIG. 5E illustrates a "direct tunneling" scenario in which the RNC 160 is directly coupled to the SGSN 130 for traffic control and directly coupled to the GGSN 120 for data traffic. FIG. 5E differs from FIG. 5C by adding a connection between the RNC 160 and the GGSN 120.

Figure 6:
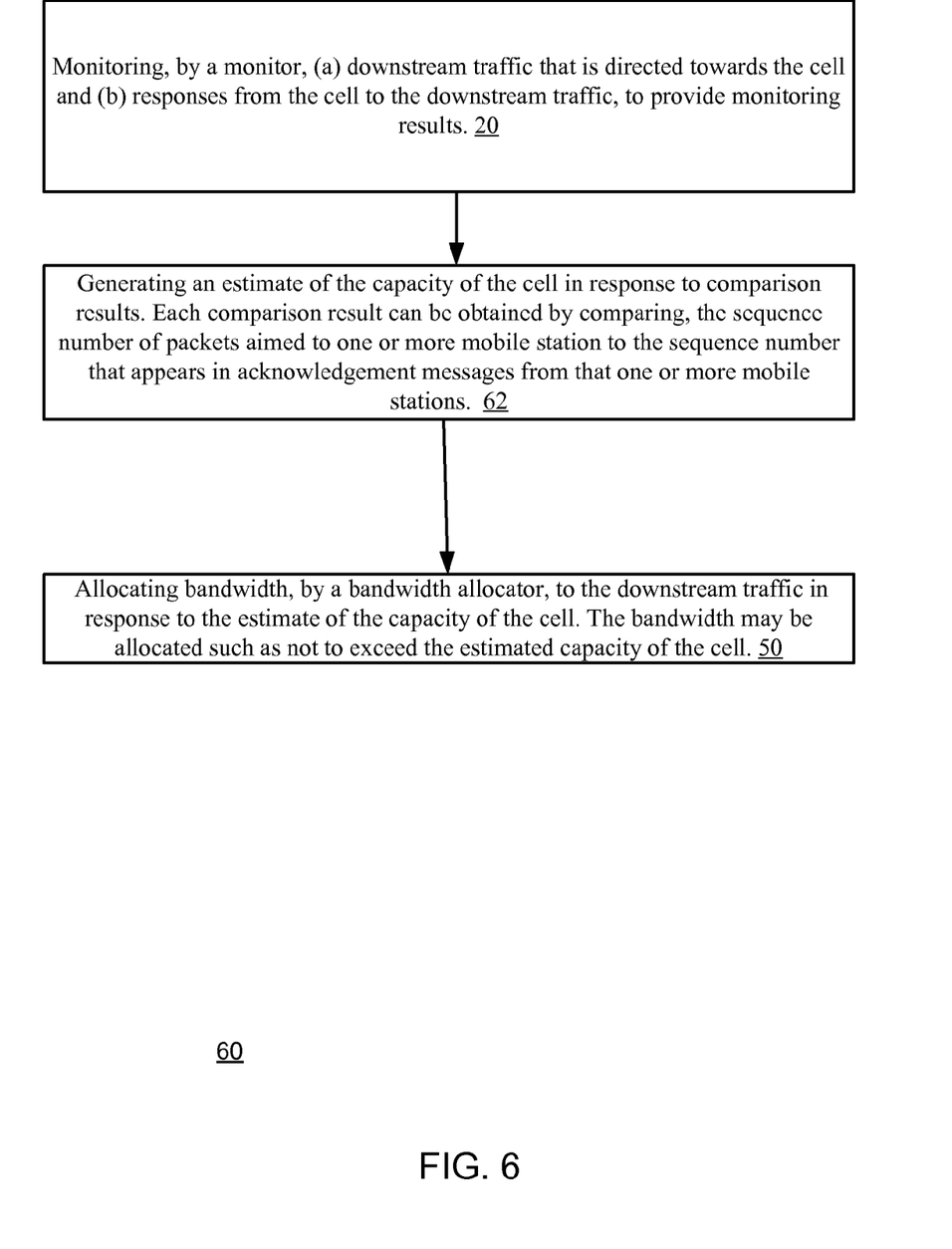
FIG. 6 illustrates a method according to an embodiment of the invention.

FIG. 6 illustrates method 60 according to an embodiment of the invention.

Method 60 may include assessing the capacity of the cell by measuring (or estimating) an amount of bytes which are currently "on the air" between the monitor and a mobile station (or any other user equipment—UE).

Method 60 may start by stage 20 of monitoring, by a monitor, (a) downstream traffic that is directed towards the cell and (b) responses from the cell to the downstream traffic, to provide monitoring results.

Stage 20 may be followed by stage 64 of generating an estimate of the capacity of the cell in response to comparison results. Each comparison result can be obtained by comparing, the sequence number of packets aimed to one or more mobile station to the sequence number that appears in acknowledgement messages from that one or more mobile stations. The sequence number that appears in an acknowledgement message is indicative of the sequence number of the packet that was sent to mobile station and triggered the acknowledgement message. The gap between a sequence number of a packet (for example—the last packet) that was sent to a mobile station to the sequence number that appears in an acknowledgement message related to that mobile station is indicative to the amount of packets that are still in the process of being sent to the mobile station or responded to—and this is indicative to the amount of bytes "on the air" in relation to that mobile station.

Summing such comparison results for all mobile stations associated to a cell can provide an estimate of the number of packets (amount of traffic) currently managed by the cell—provides an estimate of the capacity of the cell in response to the cell.

It is noted that it during a certain period queues of the base station not empty, then the cell capacity can be, at minimum, a sum of packets received by all the mobile stations in that cell. The amount of packets received by a mobile device can be summarized by the sequence numbers in the acknowledgement (ACK) messages. If the base station queue is not empty during a given second. Then for every flow, the number of L4 bytes received by a mobile station is equal to the sequence number of the last ACK in that second minus the sequence number of the first ACK reflect.

Stage 64 may be followed by stage 50 of allocating bandwidth, by a bandwidth allocator, to the downstream traffic in response to the estimate of the capacity of the cell. The bandwidth may be allocated such as not to exceed the estimated capacity of the cell.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for evaluating a capacity of a cell of a radio access network (RAN), the method comprising:
   monitoring, by a monitor, (a) downstream traffic that is directed towards the cell and (b) responses from the cell to the downstream traffic, to provide monitoring results;
   calculating, in response to the monitoring results, round trip time (RTT) statistics; and generating an estimate of the capacity of the cell in response to the RTT statistics wherein the calculating of the RTT statistics comprises calculating connection establishment RTT statistics and calculating established connection RTT statistics; and
   wherein the generating of the estimate of the capacity of the cell is based on the connection establishment RTT statistics and the established connection RTT statistics;
   wherein the method comprises increasing the estimate of the capacity of the cell when a bandwidth of the downstream traffic equals the estimate of the capacity of the cell and a current RTT value is below a lower threshold.

2. The method according to claim 1, wherein the RTT statistics are median RTT values.

3. The method according to claim 1, comprising defining a minimal
RTT value in response to the monitoring results.

4. The method according to claim 1, wherein the calculating of the RTT statistics is responsive to priorities associated with different sessions of the downstream traffic.

5. The method according to claim 1 further comprising monitoring a bandwidth of the downstream traffic.

6. The method according to claim 1, comprising allocating bandwidth, by a bandwidth allocator, to the downstream traffic in response to the estimate of the capacity of the cell.

7. The method according to claim 1, wherein the RTT statistics comprises a current RTT value.

8. The method according to claim 7, wherein the method comprises reducing a bandwidth allocated to the downstream traffic if the current RTT value exceeds an upper threshold.

9. The method according to claim 8, comprising determining the upper threshold in response to the monitoring results.

10. The method according to claim 7, comprising reducing the estimate of the capacity of the cell if the current RTT value exceeds an upper threshold.

11. The method according to claim 7, wherein the method comprises increasing the estimate of the capacity of the cell to a maximal value when a bandwidth of the downstream traffic differs from the estimate of the capacity of the cell and the current RTT value is below a lower threshold.

12. The method according to claim 1, comprising monitoring re-transmission attempts of portions of the downstream traffic to provide re-transmission statistics; and
   wherein the generating of the estimate of the capacity of the cell is response to the RTT statistics and to the re-transmission statistics.

13. The method according to claim 1, comprising monitoring Transmission Control Protocol (TCP) timeout events to provide TCP timeout statistics; and wherein the generating of the estimate of the capacity of the cell is response to the TCP timeout statistics and to the RTT statistics.

14. The method according to claim 1, wherein the monitor is coupled to an element of a core network, the core network is coupled between the RAN and another network.

15. The method according to claim 1, comprising calculating, in response to the monitoring results, RTT statistics that represents changes of the RTT over time.

16. A computer readable media that comprises a non-transitory computer readable medium that stores instructions for monitoring downstream traffic that is directed towards the cell and responses from the cell to the downstream traffic, to provide monitoring results; calculating, in response to the monitoring results, round trip time (RTT) statistics; and generating an estimate of the capacity of the cell in response to the RTT statistics; wherein the calculating of the RTT statistics comprises calculating connection establishment RTT statistics and calculating established connection RTT statistics; and wherein the generating of the estimate of the capacity of the cell is based on the connection establishment RTT statistics and the established connection RTT statistics;

wherein the estimate of the capacity of the cell is increased when a bandwidth of the downstream traffic equals the estimate of the capacity of the cell and a current RTT value is below a lower threshold.

17. A system, comprising:
   a monitor arranged to monitor downstream traffic that is directed towards the cell and responses from the cell to the downstream traffic, to provide monitoring results;
   a statistics calculator arranged to calculate, in response to the monitoring results, round time trip (RTT) statistics; wherein a calculation of the RTT statistics comprises calculating connection establishment RTT statistics and calculating established connection RTT statistics; and wherein the generating of the estimate of the capacity of the cell is based on the connection establishment RTT statistics and the established connection RTT statistics; and
   a cell capacity estimator arranged to generate an estimate of the capacity of the cell in response to the RTT statistics;
   wherein the estimate of the capacity of the cell is increased when a bandwidth of the downstream traffic equals the estimate of the capacity of the cell and a current RTT value is below a lower threshold.

\* \* \* \* \*